US011897300B2

(12) United States Patent
Liu et al.

(10) Patent No.: US 11,897,300 B2
(45) Date of Patent: Feb. 13, 2024

(54) VEHICLE, CONTROL METHOD FOR VEHICLE SUSPENSION, AND RELATED DEVICE

(71) Applicant: Huawei Digital Power Technologies Co., Ltd., Shenzhen (CN)

(72) Inventors: Fangcheng Liu, Shanghai (CN); Kai Xin, Shanghai (CN); Yunfeng Liu, Shanghai (CN)

(73) Assignee: HUAWEI DIGITAL POWER TECHNOLOGIES CO., LTD., Guangdong (CN)

( * ) Notice: Subject to any disclaimer, the term of this patent is extended or adjusted under 35 U.S.C. 154(b) by 126 days.

(21) Appl. No.: 17/552,285

(22) Filed: Dec. 15, 2021

(65) Prior Publication Data

US 2022/0194157 A1 Jun. 23, 2022

(30) Foreign Application Priority Data

Dec. 22, 2020 (CN) .................... 202011530881.X

(51) Int. Cl.
*B60G 17/019* (2006.01)
*B60G 17/015* (2006.01)
*B60G 17/016* (2006.01)

(52) U.S. Cl.
CPC ....... *B60G 17/0152* (2013.01); *B60G 17/016* (2013.01); *B60G 17/01908* (2013.01); *B60G 2400/102* (2013.01); *B60G 2500/10* (2013.01)

(58) Field of Classification Search
CPC .............. B60G 17/0152; B60G 17/016; B60G 17/01908; B60G 2400/102; B60G 2500/10
See application file for complete search history.

(56) References Cited

U.S. PATENT DOCUMENTS

| 5,428,533 A | 6/1995 | Ogawa |
| 5,526,262 A | 6/1996 | Kimura et al. |
| 5,884,921 A | 3/1999 | Katsuda |

(Continued)

FOREIGN PATENT DOCUMENTS

| CN | 1140672 A | 1/1997 |
| CN | 102205781 A | 10/2011 |
| CN | 102582389 A | 7/2012 |
| CN | 102729760 A | 10/2012 |

(Continued)

*Primary Examiner* — Toan C To
(74) *Attorney, Agent, or Firm* — WOMBLE BOND DICKINSON (US) LLP

(57) ABSTRACT

This application provides a vehicle and a control method for a vehicle suspension. The vehicle includes a first component, a second component, and a vehicle suspension. The vehicle suspension is located between the first component and the second component. The first component is a component that the vehicle suspension bears, the second component is configured to bear the vehicle suspension and the first component, and the vehicle suspension includes a variable damper connected between the first component and the second component. The variable damper is configured to provide a first force to the first component based on a first acceleration of the first component, to control a displacement of the first component relative to the second component in a height direction of the vehicle. In the embodiments of this application, bumps in a driving process of the vehicle can be effectively reduced, so that vehicle ride comfort is improved.

20 Claims, 7 Drawing Sheets

(56) References Cited

U.S. PATENT DOCUMENTS

| | | | |
|---|---|---|---|
| 10,696,119 B2 | 6/2020 | Yamamoto et al. | |
| 10,759,248 B2* | 9/2020 | Furuta | B60G 17/06 |
| 2002/0045977 A1 | 4/2002 | Uchiyama et al. | |
| 2004/0254701 A1 | 12/2004 | Laplante et al. | |
| 2006/0224286 A1 | 10/2006 | Izawa et al. | |
| 2017/0274724 A1* | 9/2017 | Liu | B60G 17/01933 |
| 2019/0030981 A1* | 1/2019 | Furuta | B60G 17/01908 |
| 2019/0255903 A1* | 8/2019 | Hirao | B60G 17/08 |
| 2019/0351726 A1* | 11/2019 | Okimura | B60G 17/0152 |
| 2020/0023705 A1* | 1/2020 | Hirao | B60G 17/0165 |
| 2021/0023904 A1* | 1/2021 | Kasuya | B60G 17/019 |
| 2021/0053409 A1* | 2/2021 | Kim | B60G 17/06 |
| 2021/0354523 A1* | 11/2021 | Hirao | F16F 15/02 |

FOREIGN PATENT DOCUMENTS

| | | | |
|---|---|---|---|
| CN | 105857003 A | 8/2016 | |
| CN | 105946496 A | 9/2016 | |
| CN | 106515348 A | 3/2017 | |
| CN | 107825930 A | 3/2018 | |
| CN | 108891220 A | 11/2018 | |
| CN | 110733308 A | 1/2020 | |
| CN | 111347830 A | 6/2020 | |
| JP | H109309315 A | 12/1997 | |
| JP | 2002321513 A | 11/2002 | |
| JP | 2005153875 A | 6/2005 | |
| JP | 2006273224 A | 10/2006 | |
| JP | 2010195232 A | 9/2010 | |
| TW | M313192 U | 6/2007 | |
| WO | 2010073412 A1 | 7/2010 | |

* cited by examiner

VEHICLE, CONTROL METHOD FOR VEHICLE SUSPENSION, AND RELATED DEVICE

CROSS-REFERENCE TO RELATED APPLICATION

This application claims priority to Chinese Patent Application No. 202011530881.X, filed on Dec. 22, 2020, which is hereby incorporated by reference in its entirety.

TECHNICAL FIELD

This application relates to the field of vehicle technologies, and in particular, to a vehicle, a control method for a vehicle suspension, and a related device.

BACKGROUND

To avoid an unnecessary bump in a driving process of a vehicle, a vehicle suspension is disposed in the vehicle. As shown in FIG. 1, the vehicle suspension is an apparatus located between a frame and a wheel. The vehicle suspension includes a plurality of components such as an elastic element and a variable damping shock absorber (namely, a variable damper). For a structural diagram of the vehicle suspension, refer to FIG. 2. As shown in FIG. 2, the variable damper is disposed around the elastic element. The elastic element and the variable damper connect the frame to the wheel. When the vehicle impacts on the ground, the elastic element may reduce the impact, or the variable damper may provide a reverse force to the frame to reduce vibration caused by the impact. The elastic element functions together with the variable damper to ensure smooth driving of the vehicle. Rigidity of the elastic element is usually fixed. A force that needs to be provided by the variable damper in the vehicle suspension to the frame should vary with an actual road condition. How to adjust the force that is to be provided by the variable damper to the frame to reduce vehicle vibration is one of currently studied problems.

In the conventional technology, a two-state skyhook control method is usually used to adjust a damping force of a variable damper. One of two damping factors of the variable damper is selected based on a relative motion trend of both ends of a vehicle suspension and a motion speed of a frame. The damping force of the variable damper is related to a damping factor of the variable damper, and different damping factors correspond to different damping forces. In other words, in the conventional technology, the damping force of the variable damper is adjusted by selecting the damping factor of the variable damper. A damping force obtained through adjustment of this control policy is not accurate enough.

SUMMARY

Embodiments of this application provide a vehicle, a control method for a vehicle suspension, and a related device, to effectively reduce bumps in a driving process of the vehicle, and improve vehicle ride comfort.

According to a first aspect, an embodiment of this application provides a vehicle. The vehicle includes a first component, a second component, and a vehicle suspension, and the vehicle suspension is located between the first component and the second component. The first component is a component that the vehicle suspension bears, the second component is configured to bear the vehicle suspension and the first component, the vehicle suspension includes a variable damper connected between the first component and the second component, and the variable damper is configured to provide a first force to the first component based on a first acceleration of the first component, to control a displacement of the first component relative to the second component in a height direction of the vehicle.

In this embodiment of this application, the first force to be provided by the variable damper to the first component is directly controlled, and the first acceleration of the first component is introduced in a control process of the first force to perform closed-loop control, to implement accurate control over the first acceleration of the first component. In this embodiment of this application, bumps in a driving process of the vehicle can be effectively reduced, so that vehicle ride comfort is improved.

With reference to the first aspect, in a first possible embodiment, the first acceleration is an acceleration of the first component in the height direction of the vehicle.

The variable damper is configured to provide the first force to the first component based on a first product of the first acceleration and a first preset control parameter.

With reference to the first embodiment of the first aspect, in a second embodiment, the variable damper is configured to provide the first force to the first component based on the first product and a second product. The second product is a product of a first speed and a second preset control parameter, and the first speed is a speed of the first component in the height direction of the vehicle.

In this embodiment of this application, in addition to introducing the first acceleration of the first component in a control process of the first force, the first speed of the first component is introduced, so that the first acceleration of the first component can be more accurately controlled, thereby further improving vehicle ride comfort.

With reference to the second embodiment of the first aspect, in a third embodiment, the variable damper is configured to provide the first force to the first component based on the first product, the second product, and a third product. The third product is a product of a relative speed and a first damping factor of the variable damper, and the relative speed is a speed of the first component relative to the second component in the height direction of the vehicle.

In this embodiment of this application, a damping force of the variable damper is considered. In addition to introducing the first acceleration of the first component and the first speed of the first component in a control process of the first force, the damping force of the variable damper is introduced, so that the first acceleration of the first component can be more accurately controlled, thereby further improving vehicle ride comfort.

With reference to any one of the first embodiment to the third embodiment of the first aspect, in a fourth embodiment, the variable damper is configured to provide the first force to the first component based on the first product and a fourth product. The fourth product is a product of a reference acceleration and the first preset control parameter.

With reference to any one of the first aspect and the foregoing embodiments of the first aspect, in a fifth embodiment, the vehicle further includes a drive circuit, and the drive circuit is connected to the variable damper. The drive circuit is configured to: receive a drive signal, and output a target drive current whose value is a target drive current value to the variable damper based on the drive signal. The target drive current value is determined based on the first force and the relative speed, and the relative speed is the speed of the first component relative to the second component in the height direction of the vehicle.

With reference to any one of the first aspect and the foregoing embodiment s of the first aspect, in a sixth embodiment, a product of the relative speed and the first speed is greater than zero. The relative speed is the speed of the first component relative to the second component in the height direction of the vehicle, and the first speed is the speed of the first component in the height direction of the vehicle.

With reference to the sixth embodiment of the first aspect, in a seventh embodiment, the variable damper is further configured to: when the product of the relative speed and the first speed is not greater than zero, provide the first force to the first component based on the relative speed and a second damping factor of the variable damper.

With reference to any one of the first aspect and the foregoing embodiment s of the first aspect, in an eighth embodiment, when the first force is greater than a maximum damping force of the variable damper, the variable damper is configured to: use the maximum damping force of the variable damper as the first force, and provide the first force to the first component.

According to a second aspect, an embodiment of this application provides a control method for a vehicle suspension. The vehicle suspension is located between a first component and a second component, the first component is a component that the vehicle suspension bears, the second component is configured to bear the vehicle suspension and the first component, the vehicle suspension includes a variable damper connected between the first component and the second component, and the control method includes:

determining, based on a first acceleration of the first component, a first force that is to be provided by the variable damper to the first component, to control a displacement of the first component relative to the second component in a height direction of a vehicle.

With reference to the second aspect, in a first embodiment, the providing a first force to the first component based on a first acceleration of the first component is:

determining, based on a first product of the first acceleration and a first preset control parameter, the first force that is to be provided by the variable damper to the first component, where the first acceleration is an acceleration of the first component in the height direction of the vehicle.

With reference to the first embodiment of the second aspect, in a second embodiment, the determining, based on a first product of the first acceleration and a first preset control parameter, the first force that is to be provided by the variable damper to the first component is:

determining, based on the first product and a second product, the first force that is to be provided by the variable damper to the first component, where the second product is a product of a first speed and a second preset control parameter, and the first speed is a speed of the first component in the height direction of the vehicle.

With reference to the second embodiment of the second aspect, in a third embodiment, the determining, based on the first product and a second product, the first force that is to be provided by the variable damper to the first component is:

determining, based on the first product, the second product, and a third product, the first force that is to be provided by the variable damper to the first component, where the third product is a product of a relative speed and a first damping factor of the variable damper, and the relative speed is a speed of the first component relative to the second component in the height direction of the vehicle.

With reference to any one of the first embodiment to the third embodiment of the second aspect, in a fourth embodiment, the determining, based on a first acceleration of the first component, a first force that is to be provided by the variable damper to the first component is:

determining, based on the first product and a fourth product, the first force that is to be provided by the variable damper to the first component, where the fourth product is a product of a reference acceleration and the first preset control parameter.

With reference to any one of the second aspect and the foregoing embodiment s of the second aspect, in a fifth embodiment, the method further includes:

determining a target drive current value based on the first force and the relative speed, where the relative speed is the speed of the first component relative to the second component in the height direction of the vehicle; and generating a drive signal based on the target drive current value, and sending the drive signal to a drive circuit of the variable damper, so that the drive circuit of the variable damper outputs a target drive current whose value is the target drive current value to the variable damper based on the drive signal.

With reference to any one of the second aspect and the foregoing embodiment s of the second aspect, in a sixth embodiment, a product of the relative speed and the first speed is greater than zero. The relative speed is the speed of the first component relative to the second component in the height direction of the vehicle, and the first speed is the speed of the first component in the height direction of the vehicle.

With reference to the sixth embodiment of the second aspect, in a seventh embodiment, the method further includes:

when the product of the relative speed and the first speed is not greater than zero, determining, based on the relative speed and a second damping factor of the variable damper, the first force that is to be provided by the variable damper to the first component.

With reference to any one of the second aspect and the foregoing embodiment s of the second aspect, in an eighth embodiment, the method further includes:

when the first force is greater than a maximum damping force of the variable damper, using the maximum damping force of the variable damper as the first force.

According to a third aspect, an embodiment of this application provides a vehicle suspension. The vehicle suspension is located between a first component and a second component, the first component is a component that the vehicle suspension bears, the second component is configured to bear the vehicle suspension and the first component, and the vehicle suspension includes a variable damper connected between the first component and the second component. The variable damper is configured to provide a first force to the first component based on a first acceleration of the first component.

According to a fourth aspect, an embodiment of this application provides a control device for a vehicle suspension. The control device includes a transceiver, a processor, and a memory, and the transceiver, the processor, and the memory are connected by using a bus system.

The memory is configured to store instructions.

The processor is configured to invoke the instructions stored in the memory, to perform the method operations in the second aspect or any embodiment of the second aspect.

According to a fifth aspect, an embodiment of this application provides a computer program product, including computer-readable instructions. When the computer-readable instructions run on one or more processors, the method operations in the second aspect or any embodiment of the second aspect are performed.

According to a sixth aspect, an embodiment of this application further provides a computer storage medium, including computer-readable instructions. When the computer-readable instructions run on one or more processors, the method operations in the second aspect or any embodiment of the second aspect are performed.

It should be understood that embodiments and beneficial effects of the plurality of aspects of this application may be mutually referenced.

DESCRIPTION OF EMBODIMENTS

The following further describes embodiments of technical solutions of this application in detail with reference to the accompanying drawings.

Figure 3:
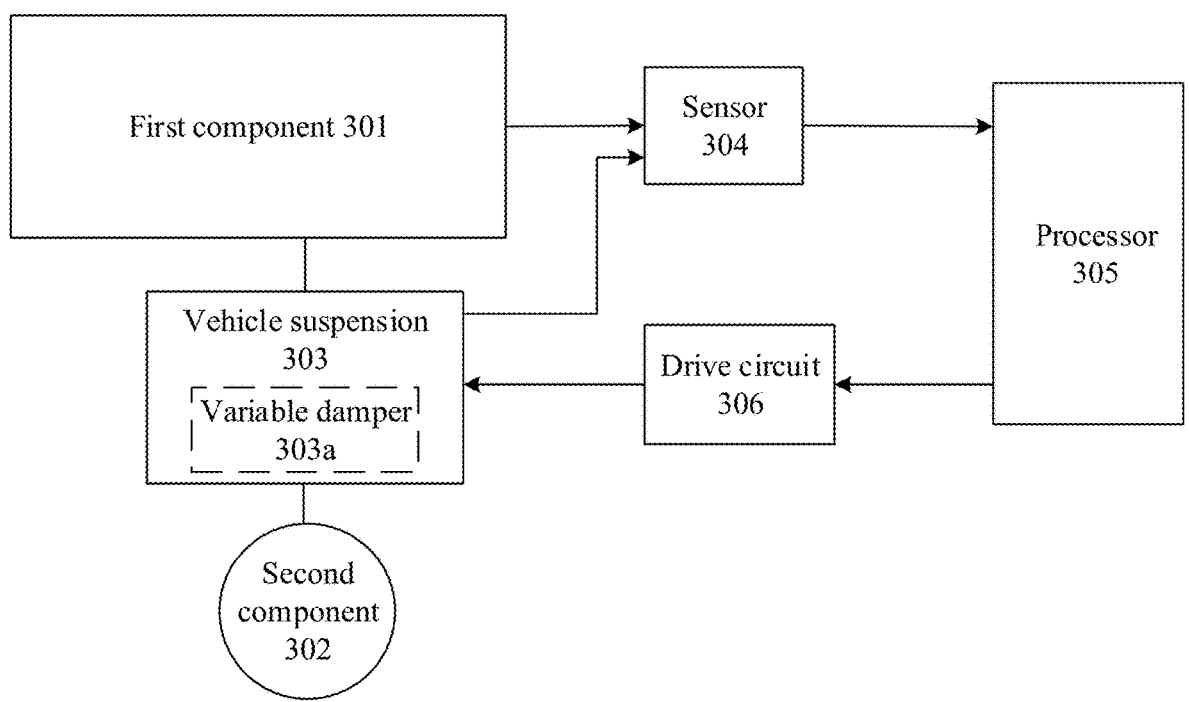
FIG. 3 is a schematic diagram of a control system for a vehicle suspension according to an embodiment of this application.

FIG. 3 is a schematic diagram of a control system for a vehicle suspension according to an embodiment of this application. As shown in FIG. 3, the control system for the vehicle suspension includes but is not limited to a first component 301, a second component 302, a vehicle suspension 303, a sensor 304, a processor 305, and a drive circuit 306. The vehicle suspension 303 is located between the first component 301 and the second component 302.

The first component 301 is connected to one end of the vehicle suspension 303, and the vehicle suspension 303 bears the first component 301 (in other words, the first component 301 is a component that the vehicle suspension 303 bears). In one embodiment, the first component 301 may also be referred to as a sprung mass, including a frame (namely, a body), an engine, a transmission, and the like.

The second component 302 is connected to the other end of the vehicle suspension 303, and the second component 302 is configured to bear the vehicle suspension 303 and the first component 301. In one embodiment, the second component 302 may also be referred to as an unsprung mass. The unsprung mass refers to a part other than the sprung mass in a vehicle, including a wheel (namely, a tire), a wheel rim, a brake disc, a caliper, a swing arm, a drive half shaft, and the like.

Figure 1:
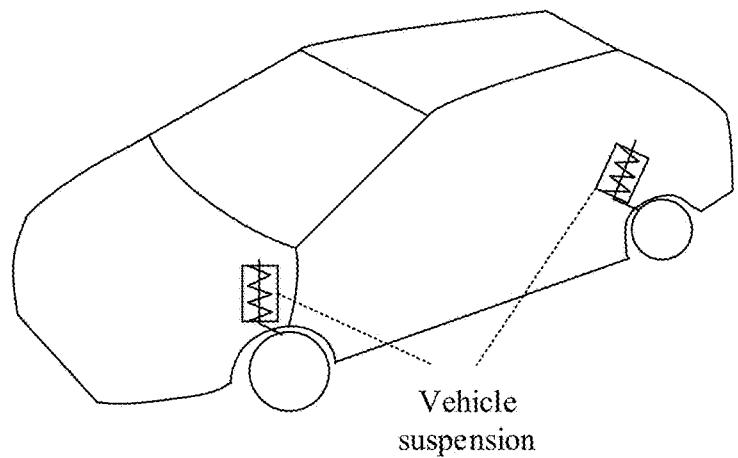
FIG. 1 is a schematic structural diagram of a vehicle.
Figure 2:
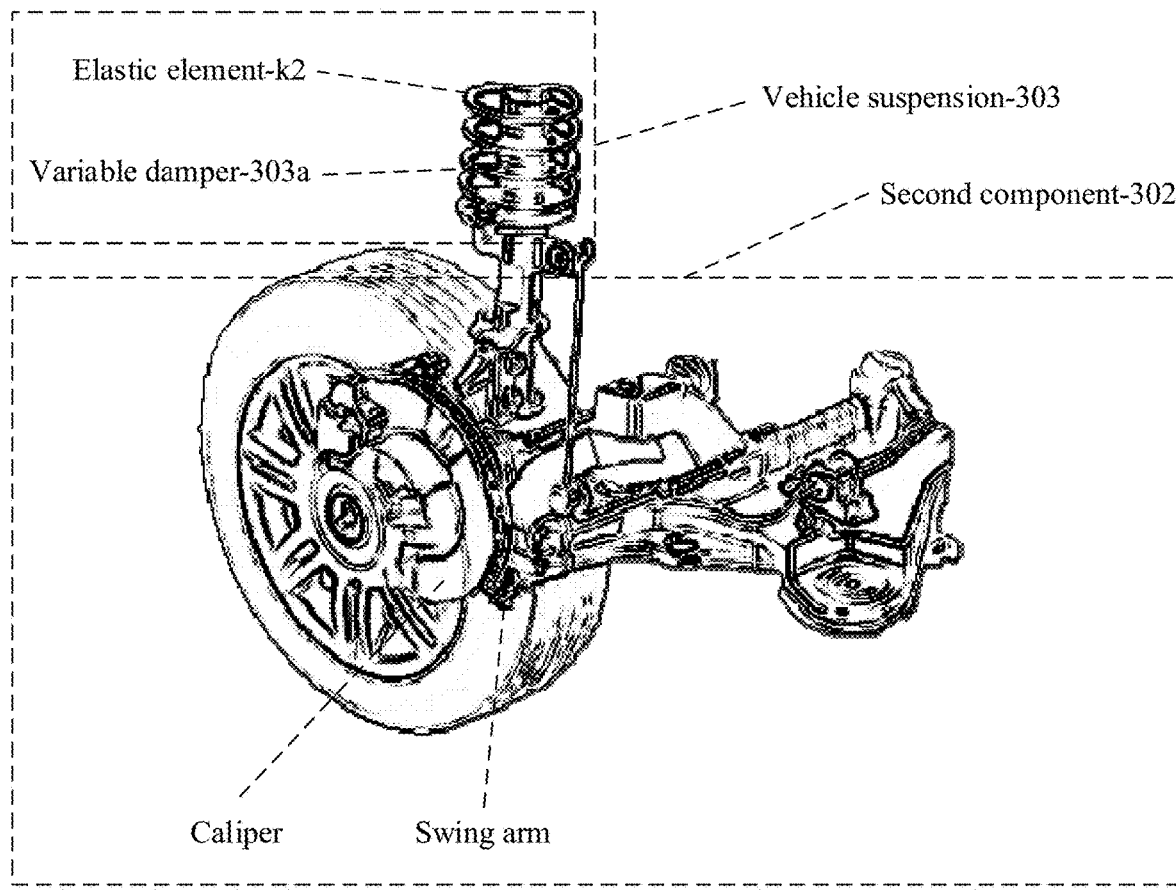
FIG. 2 is a schematic structural diagram of a vehicle suspension.

The vehicle suspension 303 includes a variable damper 303a (which may also be referred to as a variable damping shock absorber) connected between the first component 301 and the second component 302. For a structure of the variable damper 303a, refer to FIG. 2. The variable damper 303a may be, for example, a magnetorheological damper or an electro-rheological damper, and may provide different first forces to the first component 301 based on different current values.

It should be noted that the vehicle in this embodiment of this application may be an electric vehicle, a fuel vehicle, a motorcycle, or the like. For example, the vehicle is an electric vehicle. The electric vehicle includes four wheels, one vehicle suspension is correspondingly disposed for each wheel, and vehicle suspensions may be mutually independent. In this case, the vehicle suspension provided in this embodiment of this application may be understood as any one of all vehicle suspensions disposed on the vehicle.

The sensor 304 is configured to sense state variables or a state variable of the first component 301 and/or the second component 302, for example, a speed and/or an acceleration of the first component 301 and/or a speed of the second component 302.

In some embodiments, the sensor 304 includes a first speed sensor and a second speed sensor. The first speed sensor is configured to: sense a speed of the first component 301 in a height direction of the vehicle, and send the speed of the first component 301 in the height direction of the vehicle to the processor 305 or an input end of a differential circuit. In this case, the processor 305 or the differential circuit may calculate an acceleration (namely, a first acceleration) of the first component 301 in the height direction of the vehicle based on the speed of the first component 301 in the height direction of the vehicle. For example, the first speed sensor may be disposed at a connection between the first component 301 and the vehicle suspension 303. The second speed sensor is configured to: sense a speed of the second component 302 in the height direction of the vehicle, and send the speed of the second component 302 in the height direction of the vehicle to the processor 305. For example, the second speed sensor may be disposed at a connection between the vehicle suspension 303 and the second component 302.

Further, the sensor 304 further includes an acceleration sensor, and the acceleration sensor is configured to: sense the first acceleration of the first component 301, and send the first acceleration to the processor 305. For example, the acceleration sensor may be disposed at the connection between the first component 301 and the vehicle suspension 303.

A control method for a vehicle suspension provided in the embodiments of this application may be performed by the processor 305. For example, the processor 305 is connected to the sensor 304, and the processor 305 may receive a signal sent by the sensor 304, for example, the state variables of the first component 301 and the second component 302, and determine, based on the received signal sent by the sensor 304, a first force that is to be provided by the variable damper to the first component 301. Further, the processor 305 calculates a target drive current value of the variable damper in real time based on the first force, generates a drive signal based on the target drive current value, and sends the drive signal to the drive circuit 306.

The processor 305 may be a central processing unit (CPU), another general-purpose processor, a digital signal processor (DSP), an application-specific integrated circuit (ASIC), a field-programmable gate array (FPGA), another programmable logic device, a discrete gate, a transistor logic device, a discrete hardware component, or the like.

An input end of the drive circuit 306 is connected to the processor 305, and an output end of the drive circuit 306 is connected to the variable damper 303a in the vehicle suspension 303. The drive circuit 306 may receive a drive signal sent by the processor 305, and output a target drive current to the variable damper 303a based on the drive signal. The target drive current value may be understood as a current value correspondingly required for outputting the first force by the variable damper 303a.

The drive circuit 306 may include an electronic element, for example, may be a linear power supply or a switch-mode power supply. In an example in which the drive circuit 306 is a buck circuit in a switch-mode power supply, the drive signal may be a pulse width modulation (PWM) wave, and the PWM wave is used to control conduction duration of each switching transistor in the buck circuit, so that the drive circuit 306 outputs the target drive current.

Figure 4:
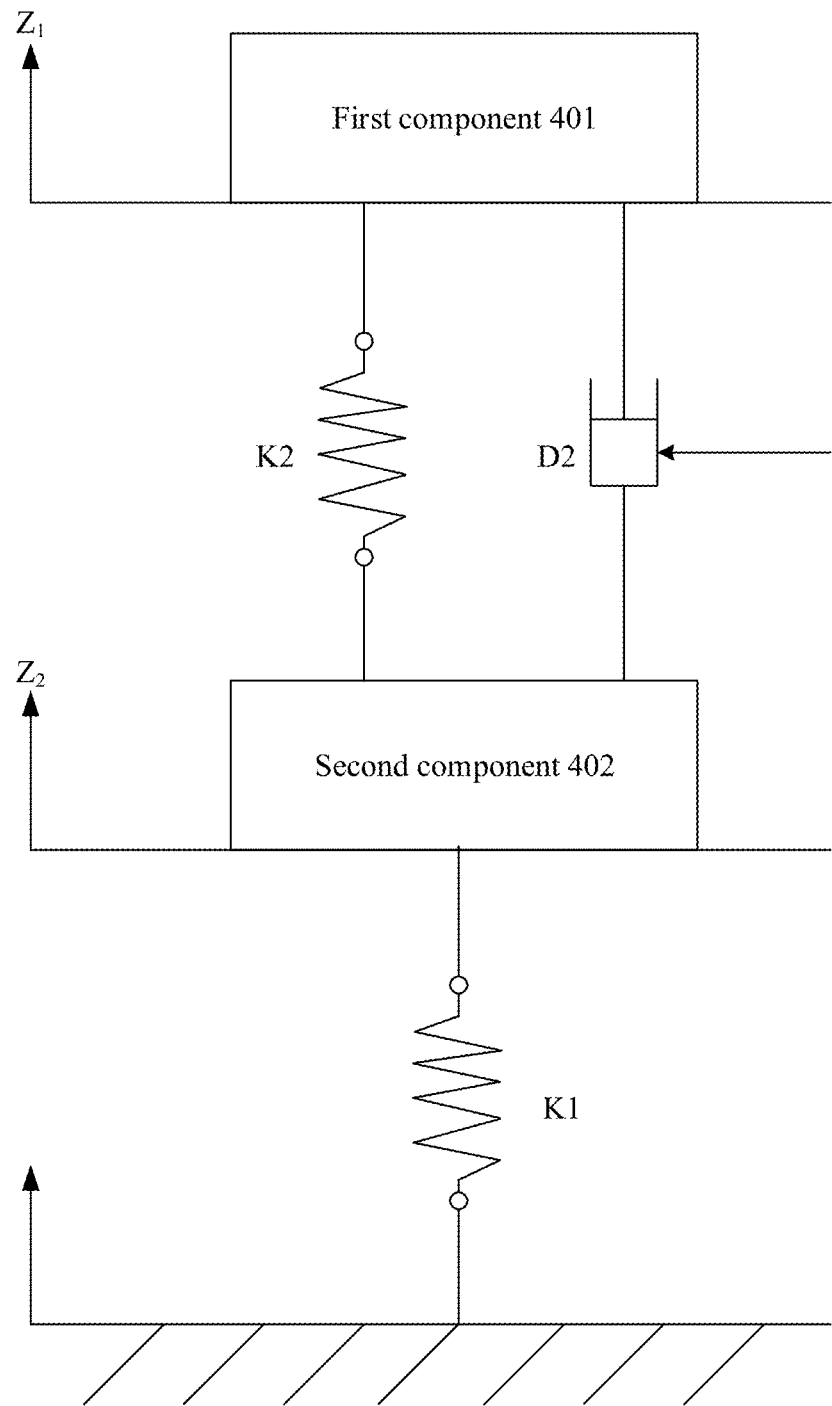
FIG. 4 is a schematic diagram of an equivalent model of a vehicle suspension according to an embodiment of this application.

FIG. 4 is a schematic diagram of an equivalent model of a vehicle suspension according to an embodiment of this application. As shown in FIG. 4, K2 represents an elastic element of the vehicle suspension, D2 represents a variable damper of the vehicle suspension, and K1 represents a wheel. A displacement of a first component 401 in a height direction of a vehicle is represented as $Z_1$, and a displacement of a second component 402 in the height direction of the vehicle is represented as $Z_2$.

Both ends of each of the elastic element K2 and the variable damper D2 are separately connected to the first component 401 and the second component 402. The elastic element K2 and the variable damper D2 are configured to bear the first component 401. The wheel K1 is a part of the second component 402 and is configured to bear components, for example, the first component 401, the elastic element K2, and the variable damper D2, other than the wheel.

Figure 5:
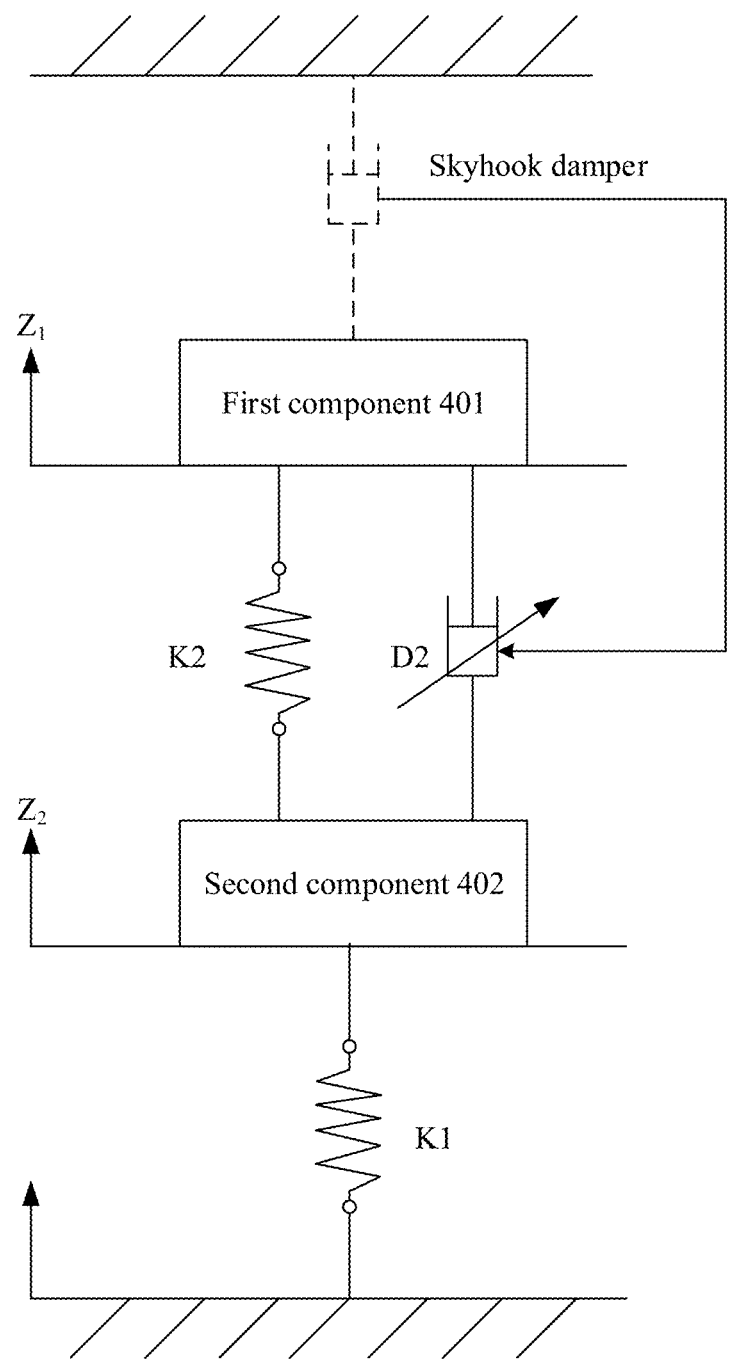
FIG. 5 is a schematic diagram of a model of a control method for a vehicle suspension according to an embodiment of this application.

For ease of understanding, it is assumed that a skyhook damper is disposed between the first component 401 and a skyhook with a fixed position. FIG. 5 is a schematic diagram of a model of a control method for a vehicle suspension according to an embodiment of this application. As shown in FIG. 5, neither the skyhook nor the skyhook damper is real, and the skyhook and the skyhook damper may be used to help understand how to suppress relative motion between the first component 401 and the skyhook. In other words, the skyhook and the skyhook damper are assumed to measure a swing degree of the first component 401. For example, the first component 401 is approaching the skyhook (in other words, swings upward in the height direction of the vehicle). To limit swinging of the first component 401, it is assumed that the skyhook damper may provide a push force to the first component 401 to prevent the first component 401 from approaching the skyhook. However, because the skyhook damper is virtual, in an embodiment, the variable damper D2 provides a pull force to the first component 401 to prevent the first component 401 from approaching the skyhook. In another example, the first component 401 is being away from the skyhook (in other words, swings downward in the height direction of the vehicle). To limit swinging of the first component 401, it is assumed that the skyhook damper may provide a pull force to the first component 401 to prevent the first component 401 from being away from the skyhook. In an embodiment, the variable damper D2 provides a push force to the first component 401 to prevent the first component 401 from being away from the skyhook. However, it may be understood that the variable damper D2 cannot provide the push force, and can only maintain existing rigidity of the variable damper D2 to prevent the first component 401 from being away from the skyhook.

A processor may obtain a speed of the first component relative to the second component in the height direction of the vehicle and a first speed, and determine a magnitude relationship between a product of the relative speed and the first speed and zero. It should be noted that the relative speed in this embodiment of this application is the speed of the first component relative to the second component in the height direction of the vehicle, and the first speed is a speed of the first component in the height direction of the vehicle.

In some embodiments, when the product of the relative speed and the first speed is greater than zero, the variable damper D2 may provide a first force to the first component 401 based on a first acceleration of the first component 401.

In an embodiment, the variable damper D2 is connected to the processor, and the processor calculates, based on the first acceleration of the first component 401, the first force to be provided by the variable damper D2 to the first component 401. For example, the processor multiplies the first acceleration by a first preset control parameter to obtain a first product (namely, the first force to be provided by the variable damper D2 to the first component 401). A formula representation is:

$$F_1 = \pm C_a \cdot \ddot{Z}_1, \quad \text{Formula 1}$$

where $C_\alpha$ is the first preset control parameter, and $\ddot{Z}_1$ is the first acceleration of the first component 401. It may be understood that $\ddot{Z}_1$ is a second-order differential representation of $Z_1$, in other words, the first acceleration may be obtained by differentiating the displacement $Z_1$ of the first component 401 in the height direction of the vehicle twice with respect to time.

Further, a bump in a driving process of the vehicle is mainly measured by an acceleration of the first component 401. To control the acceleration of the first component 401 to be near a reference acceleration, the processor multiplies the first preset control parameter by the reference acceleration to obtain a fourth product. The processor determines the first force based on the first product and the fourth product. A formula representation is:

$$F_1 = \pm C_a \cdot (\ddot{Z}_1^* - \ddot{Z}_1), \quad \text{Formula 2}$$

where $\ddot{Z}_1^*$ is the reference acceleration. For example, $\ddot{Z}_1$ may be preset to 0.

In some embodiments, when the product of the relative speed and the first speed is not greater than zero, the variable damper D2 may provide a first force to the first component 401 based on the relative speed and a second damping factor of the variable damper D2. In this case, the relative speed is multiplied by the second damping factor to obtain the first force. A formula representation is:

$$F_1 = \pm C_1 \cdot (\dot{Z}_1 - \dot{Z}_2) \quad \text{Formula 3, where}$$

$C_1$ is an intrinsic factor (namely, the second damping factor) of the variable damper in a compressed state, $\dot{Z}_1$ is the speed (namely, the first speed) of the first component 401 in the height direction of the vehicle, $\dot{Z}_2$ is a speed of the second component 402 in the height direction of the vehicle, and $\dot{Z}_1 - \dot{Z}_2$ represents the speed of the first component 401 relative to the second component 402 in the height direction of the vehicle.

Formula 2 and Formula 3 may be combined to obtain the following formula representation:

$$\dot{F}_1 = \begin{cases} \pm C_a \cdot (\ddot{Z}_1^* - \ddot{Z}_1) & (\dot{Z}_1 - \dot{Z}_2) \cdot \dot{Z}_1 > 0 \\ \pm C_1 \cdot (\dot{Z}_1 - \dot{Z}_2) & (\dot{Z}_1 - \dot{Z}_2) \cdot \dot{Z}_1 \leq 0 \end{cases} \quad \text{Formula 4}$$

In some embodiments, the first acceleration of the first component 401 is sensed by an acceleration sensor. For example, the acceleration sensor is disposed at a connection between the first component 401 and the variable damper D2 and/or the elastic element K2. The acceleration sensor may sense the first acceleration of the first component 401, and send the first acceleration sensed by the acceleration sensor to the processor.

In, in some embodiments, the first acceleration of the first component 401 is calculated by the processor after a speed sensor performs sensing. For example, the speed sensor is disposed at a connection between the first component 401 and the variable damper D2 and/or the elastic element K2. The speed sensor may sense the speed of the first component 401 in the height direction of the vehicle, and send the speed to the processor or a differential unit. The processor or the differential unit performs a differential operation on the speed of the first component 401 in the height direction of the vehicle with respect to time to obtain the first acceleration of the first component 401 in the height direction of the vehicle.

Further, the processor may determine a target drive current value based on the first force and the relative speed. In some embodiments, the processor may obtain an output characteristic of the vehicle suspension, and the output characteristic of the vehicle suspension may be understood as a relationship between the relative speed, the first force, and a drive current. In other words, for the vehicle suspension, there is a mapping relationship between first forces and drive currents when relative speeds are different.

Figure 6:
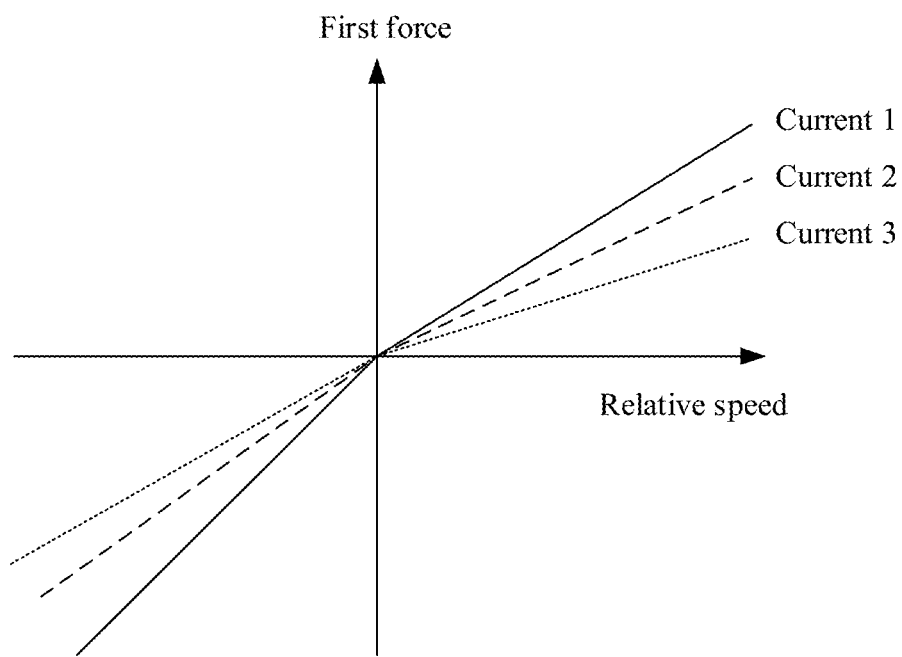
FIG. 6 is a schematic diagram of an output characteristic of a vehicle suspension according to an embodiment of this application.

For example, for the output characteristic of the vehicle suspension, refer to FIG. 6. FIG. 6 is a schematic diagram of an output characteristic of a vehicle suspension according to an embodiment of this application. The relative speed may be sensed by a speed sensor. For example, a first speed sensor is disposed at a connection between the first component 401 and the variable damper D2 and/or the elastic element K2 to sense a speed of the first component 401. A second speed sensor is disposed at a connection between the second component 402 and the variable damper D2 and/or the elastic element K2 to sense a speed of the second component 402. Using a direction of the speed of the first component 401 as a positive direction, the speed of the second component 402 is subtracted from the speed of the first component 401 to obtain the speed of the first component 401 relative to the second component 402. The processor performs fitting on the first force and the relative speed. For example, an intersection point (namely, a black point shown in FIG. 6) of the first force and the relative speed in a two-dimensional coordinate system shown in FIG. 6 is calculated. In this case, the black point is exactly located on a curve of a current 1, and a magnitude of the current 1 is the target drive current value. In another example, if the foregoing intersection point is not located on any curve shown in FIG. 6, and is located between two curves, a half of a sum of current values corresponding to the two curves near the intersection point may be used as the target drive current value, or a current value corresponding to a curve closest to the intersection point may be obtained as the target drive current value. It may be understood that only example descriptions of how to determine the target drive current value based on the first force and the relative speed are provided herein, and the descriptions should not be construed as limiting this embodiment of this application.

In some embodiments, the output characteristic of the vehicle suspension may be represented as a table. The table includes a plurality of first forces, a plurality of relative speeds, and a plurality of target drive current values. Each piece of data in the table is obtained through a plurality of tests. Examples are shown in Table 1.

TABLE 1

| First force/(N) | Relative speed/(m/s) | Target drive current value/(A) |
|---|---|---|
| 10 | 2 | 0.9 |
| 20 | 5 | 4 |
| 100 | 2 | 6 |
| ... | | |

For example, if the processor learns, through calculation, that the first force is 20 N, and the obtained relative speed is 5 m/s, the processor may determine, by querying Table 1, that the target drive current value is 4 A. In one embodiment, if the first force is 15 N and the relative speed is 5 m/s, the processor cannot find a corresponding target drive current in Table 1, and the processor may perform search within a preset range of first forces to determine the target drive current value, or the processor performs search within a preset range of relative speeds to determine the target drive current value. It should be noted that how to perform data processing on the first force and the relative speed is not limited in this embodiment of this application.

In some embodiments, the output characteristic of the vehicle suspension may be represented by a formula. A formula may be obtained by performing fitting on a plurality of first forces, a plurality of relative speeds, and a plurality of target drive current values obtained through a plurality of tests. Independent variables are the first force and the relative speed, and a dependent variable is the target drive current value. The processor may substitute the calculated first force and the obtained relative speed into the formula to calculate the target drive current value.

The processor generates a drive signal based on the target drive current value, and sends the drive signal to a drive circuit of the variable damper D2. An input end of the drive circuit is connected to the processor, and an output end of the drive circuit is connected to the variable damper D2. The drive circuit outputs a target drive current whose value is the target drive current value to the variable damper D2 based on the drive signal. For example, the drive circuit may be a linear power supply or a switch-mode power supply, for example, a buck circuit. In this case, the drive signal is a PWM wave, and the PWM wave controls conduction duration of each switching transistor in the buck circuit, so that the buck circuit outputs the target drive current to the variable damper D2.

The variable damper D2 may provide the first force to the first component 401 based on the target drive current. In some embodiments, after calculating the first force, the processor further compares the first force with a maximum damping force of the variable damper D2. It may be understood that the maximum damping force of the variable damper D2 is an intrinsic attribute of the variable damper D2 and is a fixed value. When the first force is greater than the maximum damping force of the variable damper D2, the variable damper D2 uses the maximum damping force of the variable damper D2 as the first force, and provides the first force to the first component 401. In other words, the processor determines the target drive current value by using the maximum damping force of the variable damper D2 as the first force.

Different from the conventional technology in which one of two damping factors is selected to change a damping force, in this embodiment of this application, the first force to be provided by the variable damper to the first component is directly controlled, and the first acceleration of the first component is introduced in a control process of the first force to perform closed-loop control, to implement accurate control over the first acceleration of the first component, thereby effectively reducing bumps in a driving process of the vehicle and improving vehicle ride comfort.

Figure 7:
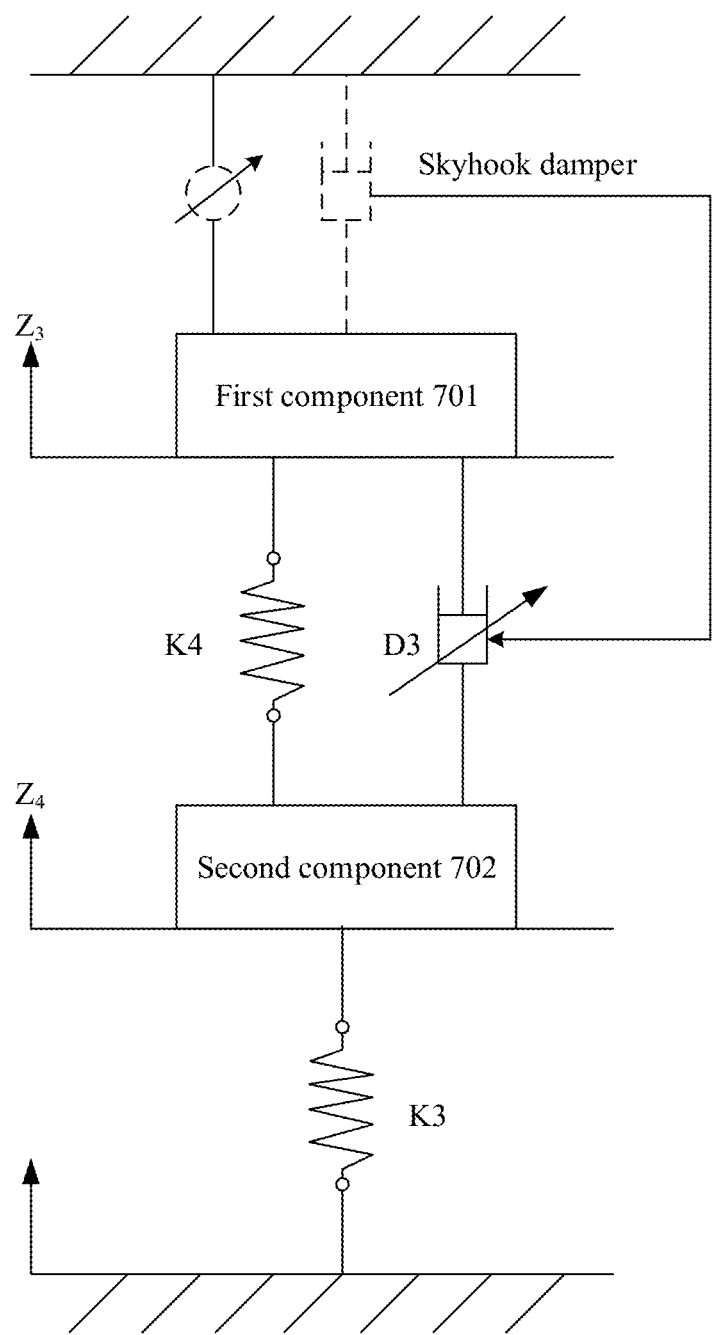
FIG. 7 is a schematic diagram of another model of a control method for a vehicle suspension according to an embodiment of this application.

FIG. 7 is a schematic diagram of another model of a control method for a vehicle suspension according to an embodiment of this application. As shown in FIG. 7, K4 represents an elastic element of the vehicle suspension, D3 represents a variable damper of the vehicle suspension, and K3 represents a wheel. A displacement of a first component 701 in a height direction of a vehicle is represented as $Z_3$, and a displacement of a second component 702 in the height direction of the vehicle is represented as $Z_4$. For a function of each component, refer to the foregoing descriptions of the model of the vehicle that are provided with reference to FIG. 4. Details are not described herein again.

A processor obtains a relative speed and a first speed, and determines a magnitude relationship between a product of the relative speed and the first speed and zero.

In some embodiments, when the product of the relative speed and the first speed is greater than zero, the processor multiplies a first acceleration by a first preset control parameter to obtain a first product. The processor multiplies a speed (namely, the first speed) of the first component 701 in the height direction of the vehicle by a second preset control parameter to obtain a second product. In this case, the processor may determine, based on the first product and the second product, a first force that is to be provided by the variable damper D3 to the first component 701. A formula representation is:

$$\dot{F}_1 = \pm C_a \cdot \ddot{Z}_3 \pm C_s \cdot \dot{Z}_3, \qquad \text{Formula 5}$$

where $C_\alpha$ is the first preset control parameter, $C_s$ is the second preset control parameter, $\ddot{Z}_3$ is the first acceleration of the first component 701, and $\dot{Z}_3$ is the first speed of the first component 701.

Further, a bump in a driving process of the vehicle is mainly measured by an acceleration of the first component 701. To control the acceleration of the first component 701 to be near a reference acceleration, the processor multiplies the first preset control parameter by the reference acceleration to obtain a fourth product. The processor determines the first force based on the first product, the second product, and the fourth product. A formula representation is:

$$\dot{F}_1 = \pm C_a \cdot (\ddot{Z}_3^* - \ddot{Z}_3) \pm C_s \cdot \dot{Z}_3, \qquad \text{Formula 6}$$

where $\ddot{Z}_3^*$ is the reference acceleration. For example, $\ddot{Z}_3^*$ may be preset to 0.

In some embodiments, when the product of the relative speed and the first speed is not greater than zero, the variable damper D3 may provide the first force to the first component 701 based on the relative speed and a second damping factor of the variable damper D3. In this case, the relative speed is multiplied by the second damping factor to obtain the first force. A formula representation is:

$$\dot{F}_1 = \pm C_1 \cdot (\dot{Z}_3 - \dot{Z}_4), \qquad \text{Formula 7}$$

where $\dot{Z}_4$ is a speed of the second component 702 in the height direction of the vehicle, and $\dot{Z}_3 - \dot{Z}_4$ represents the speed of the first component 701 relative to the second component 702 in the height direction of the vehicle.

Formula 6 and Formula 7 may be combined to obtain the following formula representation:

$$\dot{F}_1 = \begin{cases} \pm C_a \cdot (\ddot{Z}_3^* - \ddot{Z}_3) \pm C_s \cdot \dot{Z}_3 & (\dot{Z}_3 - \dot{Z}_4) \cdot \dot{Z}_3 > 0 \\ \pm C_1 \cdot (\dot{Z}_3 - \dot{Z}_4) & (\dot{Z}_3 - \dot{Z}_4) \cdot \dot{Z}_3 \leq 0 \end{cases} \qquad \text{Formula 8}$$

It may be understood that for embodiments of obtaining the first acceleration and the first speed of the first component 701 and/or the speed of the second component and determining a target drive current value based on the first force, refer to the foregoing embodiments described with reference to FIG. 4 to FIG. 6. Details are not described herein again.

In this embodiment of this application, in addition to introducing the first acceleration of the first component in a control process of the first force, the first speed of the first component is introduced, so that the first acceleration of the first component can be more accurately controlled, thereby further improving vehicle ride comfort.

In some embodiments, impact on the first force that is caused by a damping force of the variable damper D3 may be further considered. In one embodiment, the processor multiplies a first damping factor of the variable damper D3 by the relative speed to obtain a third product. The processor determines the first force based on the first product, the second product, the third product, and the fourth product. A formula representation is:

$$\dot{F}_1 = \pm C_a \cdot (\ddot{Z}_3^* - \ddot{Z}_3) \pm C_s \cdot \dot{Z}_3 \pm C_2 \cdot (\dot{Z}_3 - \dot{Z}_4), \qquad \text{Formula 9}$$

where $C_2$ is an intrinsic factor (namely, the first damping factor) of the variable damper in a stretched state.

In this case, based on Formula 9, Formula 8 may be updated to:

$$\dot{F}_1 = \begin{cases} \pm C_a \cdot (\ddot{Z}_3^* - \ddot{Z}_3) \pm C_s \cdot \dot{Z}_3 \pm C_2 \cdot (\dot{Z}_3 - \dot{Z}_4) & (\dot{Z}_3 - \dot{Z}_4) \cdot \dot{Z}_3 > 0 \\ \pm C_1 \cdot (\dot{Z}_3 - \dot{Z}_4) & (\dot{Z}_3 - \dot{Z}_4) \cdot \dot{Z}_3 \leq 0 \end{cases} \quad \text{Formula 10}$$

In this embodiment of this application, the damping force of the variable damper is considered. In addition to introducing the first acceleration of the first component and the first speed of the first component in a control process of the first force, the damping force of the variable damper is introduced, so that the first acceleration of the first component can be more accurately controlled, thereby further improving vehicle ride comfort.

Figure 8:
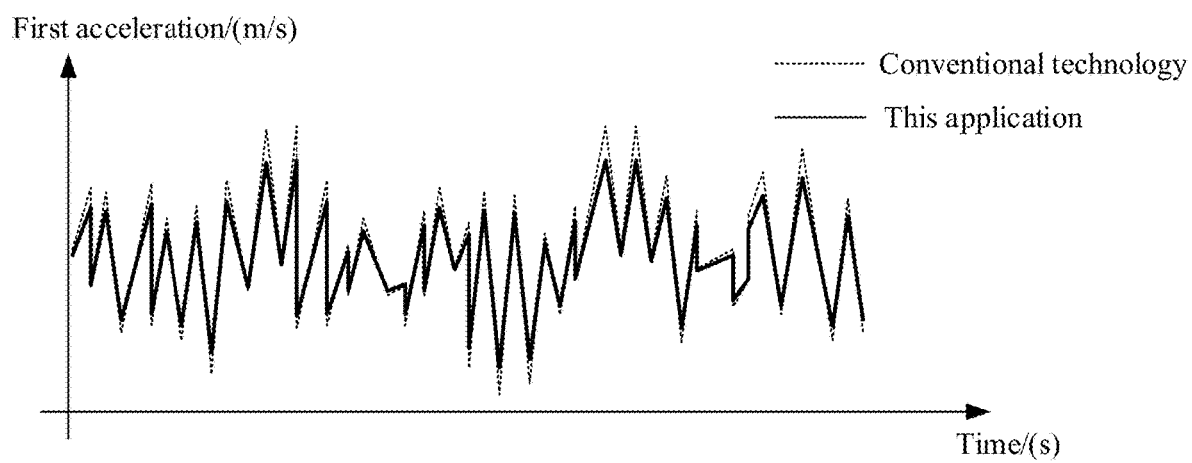
FIG. 8 is a schematic diagram of a waveform of a first acceleration according to an embodiment of this application.

To illustrate that comfort of riding the vehicle provided in this embodiment of this application is improved, the inventor of this application conducted a comparison experiment between selecting one of two damping factors of a variable damper by using a two-state skyhook control method in the conventional technology and introducing a first acceleration of a first component, a first speed of the first component, and a damping force of a variable damper provided in the embodiments of this application. For an experimental result, refer to FIG. 8. FIG. 8 is a schematic diagram of a waveform of a first acceleration according to an embodiment of this application. As shown in FIG. 8, a dotted-line waveform is a waveform of a first acceleration when the conventional technology is used, and a solid-line waveform is a waveform of a first acceleration when the embodiments of this application are used. It may be understood that vehicle ride comfort may be measured by a first acceleration of a first component. A smaller first acceleration indicates smaller swing amplitude of the first component, a lower vehicle bumping degree, and higher ride comfort. Conversely, a larger first acceleration indicates larger swing amplitude of the first component, a higher vehicle bumping degree, and lower ride comfort. It can be learned from the waveform diagram shown in FIG. 8 that acceleration change amplitude of the dotted-line waveform exceeds that of the solid-line waveform, in other words, a vehicle bumping degree in the conventional technology is higher than a vehicle bumping degree in the embodiments of this application. Therefore, comfort of riding the vehicle provided in the embodiments of this application is high.

An embodiment of this application provides a control method for a vehicle suspension. The method is applicable to the vehicles described in FIG. 1 to FIG. 7. In one embodiment, the method may be performed by a processor. The method includes the following operations.

The processor determines, based on a first acceleration of a first component, a first force that is to be provided by a variable damper to the first component, to control a displacement of the first component relative to a second component in a height direction of a vehicle.

In some embodiments, the processor determines, based on a first product of the first acceleration and a first preset control parameter, the first force that is to be provided by the variable damper to the first component, where the first acceleration is an acceleration of the first component in the height direction of the vehicle.

Further, the processor may determine, based on the first product and a second product, the first force that is to be provided by the variable damper to the first component, where the second product is a product of a first speed and a second preset control parameter, and the first speed is a speed of the first component in the height direction of the vehicle.

Still further, the processor may determine, based on the first product, the second product, and a third product, the first force that is to be provided by the variable damper to the first component, where the third product is a product of a relative speed and a first damping factor of the variable damper, and the relative speed is a speed of the first component relative to the second component in the height direction of the vehicle.

In some embodiments, the processor may determine, based on the first product and a fourth product, the first force that is to be provided by the variable damper to the first component, where the fourth product is a product of a reference acceleration and the first preset control parameter.

In some embodiments, the method may further include:

The processor may determine a target drive current value based on the first force and the relative speed, where the relative speed is the speed of the first component relative to the second component in the height direction of the vehicle.

The processor may generate a drive signal based on the target drive current value, and send the drive signal to a drive circuit of the variable damper, so that the drive circuit of the variable damper outputs a target drive current whose value is the target drive current value to the variable damper based on the drive signal.

For example, a product of the relative speed and the first speed is greater than zero. The relative speed is the speed of the first component relative to the second component in the height direction of the vehicle, and the first speed is the speed of the first component in the height direction of the vehicle.

Further, when the product of the relative speed and the first speed is not greater than zero, the processor determines, based on the relative speed and a second damping factor of the variable damper, the first force that is to be provided by the variable damper to the first component.

In some embodiments, when the first force is greater than a maximum damping force of the variable damper, the processor uses the maximum damping force of the variable damper as the first force.

An embodiment of this application further provides a vehicle suspension. The vehicle suspension is located between a first component and a second component, the first component is a component that the vehicle suspension bears, and the second component is configured to bear the vehicle suspension and the first component. The vehicle suspension includes a variable damper connected between the first component and the second component, and the variable damper may be configured to implement the functions described in FIG. 3 to FIG. 8.

An embodiment of this application further provides a control device for a vehicle suspension. The control device includes a transceiver, a processor, and a memory. The transceiver, the processor, and the memory are connected by using a bus system. The memory is configured to store instructions, and the processor is configured to invoke the instructions stored in the memory, to implement the functions described in FIG. 3 to FIG. 8.

It should be noted that the foregoing terms "first" and "second" are used only for description purposes, and cannot be understood as indicating or implying relative importance.

A person of ordinary skill in the art may understand that all or a part of the operations of the method embodiments may be implemented by a program instructing relevant hardware. The program may be stored in a computer-readable storage medium. When the program runs, the operations of the method embodiments are performed. The foregoing storage medium includes: any medium that can store program code, such as a read-only memory (ROM), a random access memory (RAM), a magnetic disk, or an optical disc.

When the foregoing integrated unit is implemented in the form of a software functional unit and sold or used as an independent product, the integrated unit may be stored in a computer-readable storage medium. Based on such an understanding, the technical solutions in the application may be essentially or the part that contributes to the conventional technology may be implemented in the form of a software product. The computer software product is stored in a storage medium, and includes several instructions for instructing a computer device (which may be a personal computer, server, or network device) to perform all or some operations of the methods provided in the embodiments of the application. The foregoing storage medium includes any medium that can store program code, for example, a mobile storage device, a ROM, a RAM, a magnetic disk, or an optical disc.

What is claimed is:

1. A vehicle comprising:
   a first component;
   a second component; and
   a vehicle suspension, wherein the vehicle suspension is located between the first component and the second component, the first component is a component that the vehicle suspension bears, the second component is configured to bear the vehicle suspension and the first component, and the vehicle suspension comprises a variable damper connected between the first component and the second component, wherein, the variable damper is configured to provide a first force to the first component based on a first acceleration of the first component to control a displacement of the first component relative to the second component in a height direction of the vehicle, and wherein the first acceleration is based on a first speed of the first component in the height direction of the vehicle.

2. The vehicle according to claim 1, wherein the first acceleration is an acceleration of the first component in the height direction of the vehicle; and
   the variable damper is configured to provide the first force to the first component based on a first product of the first acceleration and a first preset control parameter.

3. The vehicle according to claim 2, wherein the variable damper is configured to provide the first force to the first component based on the first product and a second product, wherein the second product is a product of the first speed and a second preset control parameter.

4. The vehicle according to claim 3, wherein the variable damper is configured to provide the first force to the first component based on the first product, the second product, and a third product, wherein the third product is a product of a relative speed and a first damping factor of the variable damper, and the relative speed is a speed of the first component relative to the second component in the height direction of the vehicle.

5. The vehicle according to claim 2, wherein the variable damper is configured to provide the first force to the first component based on the first product and a fourth product, wherein the fourth product is a product of a reference acceleration and the first preset control parameter.

6. The vehicle according to claim 1, wherein the vehicle further comprises a drive circuit, and the drive circuit is connected to the variable damper; and
   the drive circuit is configured to: receive a drive signal and output a target drive current whose value is a target drive current value to the variable damper based on the drive signal, wherein the target drive current value is determined based on the first force and a relative speed, and the relative speed is the first speed of the first component relative to the second component in the height direction of the vehicle.

7. The vehicle according to claim 1, wherein a product of a relative speed and the first speed is greater than zero, wherein the relative speed is the first speed of the first component relative to the second component in the height direction of the vehicle.

8. The vehicle according to claim 7, wherein the variable damper is further configured to: when the product of the relative speed and the first speed is not greater than zero, provide the first force to the first component based on the relative speed and a second damping factor of the variable damper.

9. The vehicle according to claim 1, wherein when the first force is greater than a maximum damping force of the variable damper, and the variable damper is configured to: use the maximum damping force of the variable damper as the first force, and provide the first force to the first component.

10. A control method for a vehicle suspension, wherein the vehicle suspension is located between a first component and a second component, the first component is a component that the vehicle suspension bears, the second component is configured to bear the vehicle suspension and the first component, the vehicle suspension comprises a variable damper connected between the first component and the second component, and the control method comprises:
    determining, based on a first acceleration of the first component, a first force that is to be provided by the variable damper to the first component to control a displacement of the first component relative to the second component in a height direction of a vehicle, wherein the first acceleration is based on a first speed of the first component in the height direction of the vehicle.

11. The method according to claim 10, wherein the providing theft first force to the first component based on theft first acceleration of the first component comprises:
    determining, based on a first product of the first acceleration and a first preset control parameter, the first force that is to be provided by the variable damper to the first component, wherein the first acceleration is an acceleration of the first component in the height direction of the vehicle.

12. The control method according to claim 11, wherein the determining, based on the first product of the first acceleration and the first preset control parameter, the first force that is to be provided by the variable damper to the first component comprises:
    determining, based on the first product and a second product, the first force that is to be provided by the variable damper to the first component, wherein the second product is a product of the first speed and a second preset control parameter.

13. The control method according to claim 12, wherein the determining, based on the first product and the second product, the first force that is to be provided by the variable damper to the first component comprises:

determining, based on the first product, the second product, and a third product, the first force that is to be provided by the variable damper to the first component, wherein the third product is a product of a relative speed and a first damping factor of the variable damper, and the relative speed is a speed of the first component relative to the second component in the height direction of the vehicle.

14. The control method according to claim 11, wherein the determining, based on the first acceleration of the first component, the first force that is to be provided by the variable damper to the first component comprises:

determining, based on the first product and a fourth product, the first force that is to be provided by the variable damper to the first component, wherein the fourth product is a product of a reference acceleration and the first preset control parameter.

15. The control method according to claim 10, wherein the method further comprises:

determining a target drive current value based on the first force and a relative speed, wherein the relative speed is the first speed of the first component relative to the second component in the height direction of the vehicle; and generating a drive signal based on the target drive current value, and sending the drive signal to a drive circuit of the variable damper, so that the drive circuit of the variable damper outputs a target drive current whose value is the target drive current value to the variable damper based on the drive signal.

16. The control method according to claim 10, wherein a product of a relative speed and the first speed is greater than zero, wherein the relative speed is the first speed of the first component relative to the second component in the height direction of the vehicle.

17. The control method according to claim 16, wherein the method further comprises:

when the product of the relative speed and the first speed is not greater than zero, determining, based on the relative speed and a second damping factor of the variable damper, the first force that is to be provided by the variable damper to the first component.

18. The control method according to claim 10, wherein the method further comprises:

when the first force is greater than a maximum damping force of the variable damper, using the maximum damping force of the variable damper as the first force.

19. A vehicle suspension located between a first component and a second component, the first component is a component that the vehicle suspension bears, and the second component is configured to bear the vehicle suspension and the first component, wherein the vehicle suspension comprises:

a variable damper connected between the first component and the second component, wherein the variable damper is configured to provide a first force to the first component based on a first acceleration of the first component, and wherein the first acceleration is based on a first speed of the first component in a height direction of the first component.

20. A control device for a vehicle suspension, wherein the control device comprises a transceiver, a processor, and a memory, and the transceiver, the processor, and the memory are connected by using a bus system;

the memory is configured to store instructions; and the processor is configured to invoke the instructions stored in the memory, to perform a control method for a vehicle suspension, wherein the vehicle suspension is located between a first component and a second component, the first component is a component that the vehicle suspension bears, the second component is configured to bear the vehicle suspension and the first component, the vehicle suspension comprises a variable damper connected between the first component and the second component, and the control method implemented by the processor comprises:

determining, based on a first acceleration of the first component, a first force that is to be provided by the variable damper to the first component to control a displacement of the first component relative to the second component in a height direction of a vehicle.

* * * * *

UNITED STATES PATENT AND TRADEMARK OFFICE
CERTIFICATE OF CORRECTION

| | |
|---|---|
| PATENT NO. | : 11,897,300 B2 |
| APPLICATION NO. | : 17/552285 |
| DATED | : February 13, 2024 |
| INVENTOR(S) | : Fangcheng Liu, Kai Xin and Yunfeng Liu |

It is certified that error appears in the above-identified patent and that said Letters Patent is hereby corrected as shown below:

In the Claims

In Claim 11, Column 16, Lines 46-48, delete "providing theft first force to the first component based on theft first acceleration of the first component comprises" and insert --providing the first force to the first component based on the first acceleration of the first component comprises--.

Signed and Sealed this
Thirtieth Day of April, 2024

Katherine Kelly Vidal
*Director of the United States Patent and Trademark Office*